May 9, 1967 R. F. WHITLOW 3,318,753
TAPE APPLICATOR
Filed Aug. 6, 1964 2 Sheets-Sheet 1

INVENTOR.
RICHARD F. WHITLOW
BY
Lockwood, Woodard, Smith & Weikart
Attorneys

INVENTOR.
RICHARD F. WHITLOW
BY
Lockwood, Woodard, Smith & Weikart
Attorneys

United States Patent Office 3,318,753

Patented May 9, 1967

3,318,753

TAPE APPLICATOR

Richard F. Whitlow, Indianapolis, Ind., assignor of forty-nine percent to Ralph W. Eberhart Filed Aug. 6, 1964, Ser. No. 387,965

11 Claims. (Cl. 156—461)

This invention relates generally to tape applicators and in particular to a tape applicator for masking tapes or building tapes, the applicator having a flexibility of adjustment permitting its use in areas of restricted space and the application of tapes to corner surfaces not characteristic of prior art applicators.

In the application of building tapes or masking tapes it is often desirable to tape both intersecting surfaces of a closed corner. While tape applicators of various types are not unknown in the prior art, none are provided with a displaceable hand grip component so that both intersecting surfaces of a closed corner can be taped. Further, these prior art structures are capable of comfortable, convenient use only by right-handed persons, there being no way of easily shifting the orientation of the hand-grip portion with respect to the tape applying head of the device. Additionally, tapes of the type referred to must often be applied in restricted spaces into which various obstructions may protrude. It is highly desirable, under these conditions, that the tape applying head be flexibly attached to the body of the applicator so that, in the application of tape, when an obstruction is approached, the applicator may be swiveled around the obstruction with the tape head remaining in proper tape-applying position.

It is the primary object of the present invention to provide a tape applicator which has a flexibility in the orientation of its component parts such as to permit taping of both surfaces of a closed corner and taping in obstructed areas.

It is a further object of the present invention to provide an applicator of the type referred to above which has means for maintaining the desired tilt to the applicator enabling tape to be projected into the apex of a closed corner surface.

These and other objects will become apparent as the description proceeds with reference to the accompanying drawings in which.

Figure 1:
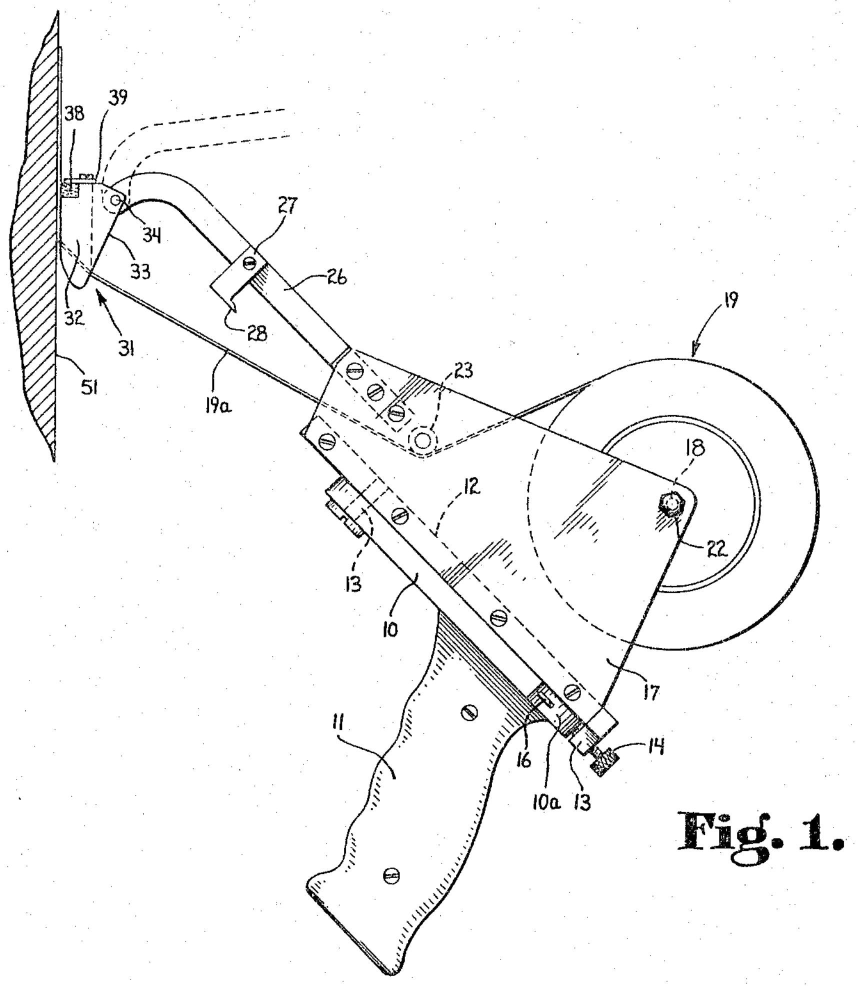
FIG. 1 is a side view of a tape applying apparatus embodying the present invention.
Figure 3:
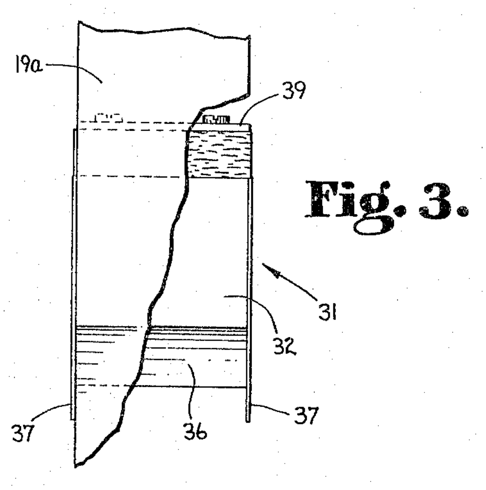
FIG. 3 is a plan view of the tape applying surface of the head-component of the apparatus of FIG. 1.
Figure 2:
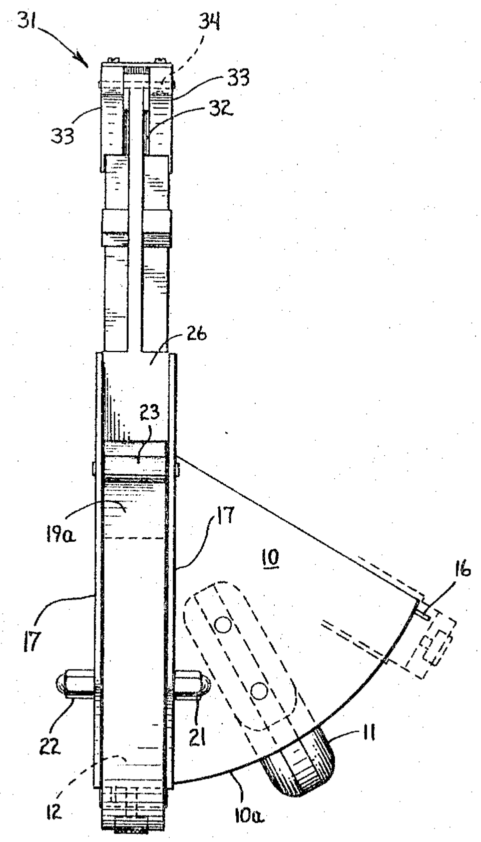
FIG. 2 is a top plan view of the apparatus shown in FIG. 1.

Referring initially to FIGS. 1, 2 and 3, the tape applying apparatus of the present invention includes a plate 10 having a circular sector configuration as will be evident particularly from FIG. 2. Rigidly attached to and depending from the underside of the plate 10 is a hand-grip element 11.

A tape carrying member is mounted on the upper face of the plate 10 and includes an element 12, rectangular in cross section which is pivotally secured to the plate 10 adjacent the apex thereof by means of the pin 13 which extends through the plate and the member 12. The member 12 is elongated so as to extend beyond the circumferential arc 10*a* of the plate and is provided with a depending portion 13 having a threaded aperture therein receiving the knurled thumb screw 14. As will be evident from FIG. 1 the thumb screw 14, when turned down so as to engage the arc surface 10*a*, provides a means for locking the pivotal position of the member 12 with relation to the plate 10. Stops 16 are provided adjacent each end of the arc surface 10*a* to confine the positioning of the member 12 within the curved surface 10*a* of the plate 10. As illustrated in solid lines in FIG. 2, the plate 12 is adjacent one positional limit and the opposite positional limit is shown fragmentarily by broken lines.

Rigidly attached to, and extending upwardly from, the sides of the member 12 are two identical plates 17. Near their upper margin registering apertures are formed in the plates 17 to provide support for a shaft 18 which extends between the plates and provides a bearing support for a roll of tape to be applied by the apparatus, the tape roll being indicated generally at 19. The shaft 18 is provided with a head 21 and a nut 22, of identical configuration and length, the nut being threaded on the end of the shaft and removable therefrom to permit replacement of a spent roll of tape.

Extending between the two plates 17 and free to rotate is a guide roller 23 which overlies the tape, indicated at 19*a* extending from the roll 19. Also rigidly mounted between the plates 17 is an arm 26 of reduced cross section beyond the portion disposed between the plates as will be evident from FIG. 2. The shank of the arm 26 may be provided with a member 27 having a tape-tearing blade 28 thereon. This member 27 is provided merely for convenience in severing the tape at the end of an application run and performs no function in the actual application of tape with the apparatus. The outer end of the arm 26 is provided with a substantially 90° bend and pivotally supports a tape-applying head indicated generally at 31. The head includes a flat block 32 provided with extending, spaced ears 33. The ears 33 accommodate a pivot pin 34 which extends freely through an aperture in the end of the arm 26 to provide a pivotal connection of the head to the end of the arm. As may best be seen in FIG. 3 a portion of the member 32 is cut away to provide an inclined surface 36 over which the tape may slide as it is applied and the side rails 37 formed on the head serve to retain the tape in place on the head. The block 32 also accommodates a wiper 38 which is preferably formed of felt or similar somewhat resilient fibrous material. The felt wiper 38 is held in place on the head by the pad or plate 39 fastened by screws to the block 32 and clamping the felt wiper in place.

In operation, when tape is to be applied along a flat surface with no corners or obstructions nearby, the member 12 may be located at substantially the mid point of the arc surface 10*a* on the member 10 and tape applied as indicated in FIG. 1 by moving the applicator along the surface (indicated at 51 in FIG. 1) to which the tape is to be applied. If any protruding obstructions are encountered, the applicator may be moved to avoid these while retaining the head 31 in tape applying position against the surface 51 by pivoting the apparatus on the pivotal connection 34 between the head and the arm 26, such pivotal positioning being indicated by broken lines in FIG. 1. Such pivotal movement of the arm 26 with relation to the head 31, it will be noted, is in a plane which is normal to the plane of positional adjustment of the member 12 with relation to the member 10.

Figure 4:
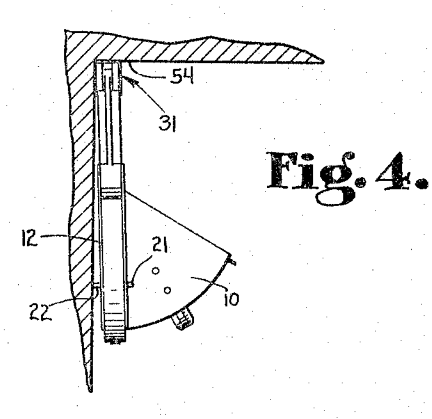
FIG. 4 is a top plan, schematic view showing the position of the tape applying apparatus when tape is applied to one of two intersecting plane surfaces such as at the corner of a room.
Figure 5:
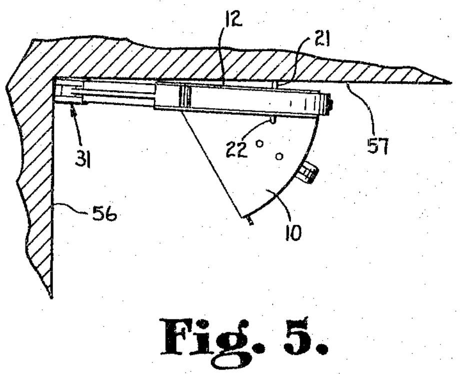
FIG. 5 is a view similar to FIG. 4 but showing the application of tape to the other of the two intersecting plane surfaces forming the corner.

When tape is to be applied to two intersecting plane surfaces, for example, to the inside corner illustrated in FIGS. 4 and 5, the member 12 may be positioned at the extreme left-hand margin of the plate 10 as shown in solid lines in FIG. 2. The applicator may then be moved along one of the intersecting surfaces (indicated at 54 in FIG. 4). As shown in FIG. 4, the sidewardly extending member or abutment 22 slides along the other of the two intersecting surfaces (the surface indicated at 56 in FIG. 4). As shown in FIG. 4, this assures a tilt or inclination of the apparatus which projects the tape as it is applied into the depths of the corner of the two intersecting surfaces 54 and 56 and maintains the inner edge of the tape in its location directly at the corner or intersection of the surfaces.

When the marginal area at the corner of intersection of the surface 54 has received tape, the position of the member 12 with relation to the plate 10 may be shifted to its opposite extreme, illustrated fragmentarily by broken lines in FIG. 2. As will be evident from FIG. 5 when so adjusted, the apparatus may be utilized to apply tape to the marginal area of the surface 56 adjacent the intersection of the surfaces 56 and 57. Engagement of the abutment 21 with the surface 57 maintains the desired tilt of the apparatus so as to maintain the location of the tape on the surface 56 directly at the corner of intersection of the two surfaces 56 and 57.

Figure 6:
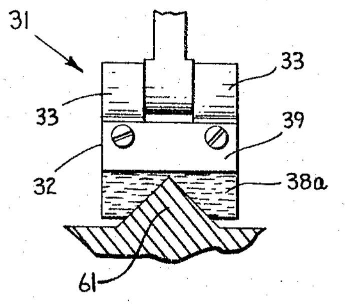
FIG. 6 is a plan view of an alternate embodiment of the tape applying surface of the head-component of the apparatus of FIG. 1.

Referring to FIG. 6, the head 31 is shown accommodating a wiper element 38*a* which, unlike the wiper 38 of FIG. 1, has a V-shaped cut-away, this wiper 38*a* adapting the head for application of tape to a molding or similar element, indicated at 61, which is generally triangular in cross section. It will be understood that the application of tape to a triangularly cross sectioned member shown in FIG. 6 is merely illustrative of the adaptability of the head 31 in that wiper members of various surface configurations may be placed in the head. The head may thus be used to apply tape to various irregularly shaped surfaces merely by providing it with a properly contoured felt wiper member. It will also be obvious that heads of various widths may be accommodated on the arm 26 so that tape of varying widths may be applied with the apparatus.

While the invention has been disclosed and described in some detail in the drawings and foregoing description, they are to be considered as illustrative and not restrictive in character, as other modifications may readily suggest themselves to persons skilled in this art and within the broad scope of the invention, reference being had to the appended claims.

The invention claimed is:

1. Tape applying apparatus comprising a plate having a circular sector configuration, a hand-grip element depending from one face of said plate, a member adapted to support a roll of tape with the roll being free to rotate as tape is withdrawn therefrom, said member being pivotally secured to said plate adjacent the apex thereof and on the face opposite said hand-grip element, means adjacent the circumferential arc of said plate for locking the pivotal position of said member with relation to said plate, and a tape-applying head pivotally supported by said member for pivotal movement in a plane normal to the plane of pivotal movement of said member with relation to said plate, said head being adapted to accommodate tape from the roll for application to a surface, the positional adjustability of said member with relation to said plate and the freedom for pivotal motion of said head permitting manipulation of said tape applying apparatus in obstructed areas and the application of tape to the apex area of intersecting plane surfaces.

2. A tape applying apparatus as claimed in claim 1 in which the tape-applying head carries a removable felt wiper shaped to conform to the surface receiving the tape and adapted to overlie the tape at its point of application to the receiving surface.

3. A tape applying apparatus as claimed in claim 1 in which said member is provided with an abutment extending from each of its opposite side margins, the appropriate one of said abutment being adapted to engage one of two intersecting plane surfaces when the other surface is receiving tape along the line of intersection of the surfaces, whereby said applying apparatus is given the desired tilt for maintaining application of the tape at the intersecting corner of the surfaces.

4. Tape applying apparatus comprising a plate, a hand-grip element depending from one face of said plate, a member adapted to support a roll of tape with the roll being free to rotate as tape is withdrawn therefrom, said member being pivotally secured to said plate on the face opposite said hand-grip element, means cooperating with said plate and said member for locking the pivotal position of said member with relation to said plate, and a tape-applying head pivotally supported by said member for pivotal movement in a plane normal to the plane of pivotal movement of said member with relation to said plate, said head being adapted to accommodate tape from the roll for application to a surface, the positional adjustability of said member with relation to said plate and the freedom for pivotal motion of said head permitting manipulation of said tape applying apparatus in obstructed areas and the application of tape to the apex area of intersecting plane surfaces.

5. A tape applying apparatus as claimed in claim 4 in which the tape-applying head carries a removable felt wiper shaped to conform to the surface receiving the tape and adapted to overlie the tape at its point of application to the receiving surface.

6. A tape applying apparatus as claimed in claim 4 in which said member is provided with an abutment extending from each of its opposite side margins, the appropriate one of said abutment being adapted to engage one of two intersecting plane surfaces when the other surface is receiving tape along the line of intersection of the surfaces, whereby said applying apparatus is given the desired tilt for maintaining application of the tape at the intersecting corner of the surfaces.

7. Tape applying apparatus comprising a plate, a hand-grip element depending from one face of said plate, a member adapted to support a roll of tape with the roll being free to rotate as tape is withdrawn therefrom, said member being pivotally secured to said plate on the face opposite said hand-grip element, means cooperating with said plate and said member for locking the pivotal position of said member with relation to said plate, and a tape-applying head pivotally supported by said member, said head being adapted to accommodate tape from the roll for application to a surface, the positional adjustability of said member with relation to said plate and the freedom for pivotal motion of said head with relation to said member permitting manipulation of said tape applying apparatus in obstructed areas and the application of tape to the apex area of intersecting plane surfaces.

8. A tape applying apparatus as claimed in claim 7 in which the tape-applying head carries a removable felt wiper shaped to conform to the surface receiving the tape and adapted to overlie the tape at its point of application to the receiving surface.

9. A tape applying apparatus as claimed in claim 7 in which said member is provided with an abutment extending from each of its opposite side margins, the appropriate one of said abutment being adapted to engage one of two intersecting plane surfaces when the other surface is receiving tape along the line of intersection of the surfaces, whereby said applying apparatus is given the desired tilt for maintaining application of the tape at the intersecting corner of the surfaces.

10. Tape applying apparatus comprising a plate having a circular sector configuration, a hand-grip element depending from one face of said plate, a member adapted to support a roll of tape with the roll being free to rotate as tape is withdrawn therefrom, said member being pivotally secured to said plate adjacent the apex thereof and on the face opposite said hand-grip element, means adjacent the circumferential arc of said plate for locking the pivotal position of said member with relation to said plate, and a tape-applying head supported by said member and adapted to accommodate tape from the roll for application to a surface, the positioned adjustability of said member with relation to said plate permitting manipulation of said tape applying apparatus in obstructed areas and the application of tape to the apex area of intersecting plane surfaces.

11. Tape applying apparatus comprising a plate, a hand-grip element depending from one face of said plate, a member adapted to support a roll of tape with the roll being free to rotate as tape is withdrawn therefrom, said member being pivotally secured to said plate on the face opposite said hand-grip element, means cooperating with said plate and said member for locking the pivotal position of said member with relation to said plate, and a tape-applying head supported by said member and adapted to accommodate tape from the roll for application to a surface, the positional adjustability of said member with relation to said plate permitting manipulation of said tape applying apparatus in obstructed areas and the application of tape to the apex area of intersecting plane surfaces.

No references cited.

EARL M. BERGERT, *Primary Examiner.*

M. L. KATZ, *Assistant Examiner.*